United States Patent [19]

Holcomb, Jr.

[11] 3,949,843
[45] Apr. 13, 1976

[54] BRAKE ADJUSTER

[75] Inventor: Orla L. Holcomb, Jr., South Bend, Ind.

[73] Assignee: Clark Equipment Company, Buchanan, Mich.

[22] Filed: Apr. 7, 1975

[21] Appl. No.: 566,013

[52] U.S. Cl. .............................. 188/196 R; 188/71.8
[51] Int. Cl.² .......................................... F16D 65/54
[58] Field of Search .............. 188/71.7, 71.8, 196 R, 188/196 P, 79.5 GE

[56] References Cited
UNITED STATES PATENTS

| 3,542,165 | 11/1970 | Lucien | 188/196 R |
| 3,729,072 | 4/1973 | Borkowski | 188/196 P |
| 3,844,388 | 10/1974 | Ditlinger et al. | 188/196 R |

Primary Examiner—Duane A. Reger
Attorney, Agent, or Firm—Ernst H. Ruf

[57] ABSTRACT

An automatically operative brake adjuster includes a cup-shaped member attached to a brake carrier member, with this member cooperating with a stepped bore in the carrier member to form an annular chamber having spaced opposed end surfaces. An annular follower member, slidably received and spring-biased within the annular chamber, has flange portions on opposite ends, with these flange portions cooperating with the opposed end surfaces to limit the movement of the follower member in both the brake-release and the brake-application directions. A piston, extending freely through the annular chamber, includes a tapered portion that carries a deformable hollow member in the annular chamber and is interference-fitted therewith. The hollow member, which preferably takes the shape of a circular or elliptical cylinder, is in abutment with one of the flange portions and, in response to pressurized fluid, the piston moves together with the hollow member and follower in the brake-application direction until the other flange portion engages one of the opposed end surfaces whereupon the piston is forceably urged through at least an axial portion of the hollow member and causes deformation thereof and axially repositions the piston to take up the undesired brake clearance. Brake release, in response to depressurization of the piston and the urging of the spring on the follower member, moves the piston together with the hollow and follower members until the latter engages one of the opposed end surfaces and thereby establishes a constant brake running clearance.

8 Claims, 3 Drawing Figures

BRAKE ADJUSTER

BACKGROUND OF THE INVENTION

1. Field of the Invention

The field of art to which this invention pertains is that of brakes, and, more particularly, to an automatic brake adjuster mechanism adapted to compensate for progressive wear of the brake friction material and maintain substantially constant brake operating clearances.

2. Description of the Prior Art

The prior art is replete with automatic brake adjusting and reset devices that progressively advance the retracted position of the piston to compensate for brake wear. Examples of prior art patents include U.S. Pat. No. 3,376,959 to Holcomb, Jr., U.S. Pat. No. 3,542,165 to Lucien, U.S. Pat. No. 3,729,072 to Borkowski and U.S. Pat. No. 3,844,388 to Ditlinger et al. While these prior art devices appear to perform satisfactorily in the brake environment for which they were designed, they appear to be structurally complex, costly to manufacture and sometimes difficult to service.

SUMMARY OF THE INVENTION

The brake adjuster of this invention solves many of the previously-noted problems of complexity, cost and serviceability in that it utilizes a simple cup-shaped member attached to a brake carrier member, with the open end of the cup-shaped member cooperating with a stepped bore in the carrier member to form an annular chamber that contains a deformable hollow member and a spring-biased simple follower member, both of which are adapted to cooperate with a piston member. In order to take up excessive clearance, the piston member is forceably urged through at least an axial portion of the deformable hollow member and causes deformation thereof and thereby axially repositions the piston member to the extent provided by the undesired brake clearance between frictionally engageable members of the brake.

In summary, the brake adjusting apparatus of this invention, which is applicable for brakes of all kinds having a constant running clearance and being energized by pressurized fluid, includes a cylindrical chamber having a fluid connection on one end, and an annular chamber having spaced first and second annular end surfaces, with the annular chamber being adjacent to but radially outwardly spaced from the open end of the cylindrical chamber. An annular follower member is slidably received within the annular chamber and has a radially outwardly extending flange portion on one end that is adjacent to the first annular end surface which in turn is adjacent to the cylinder open end. The annular follower member also includes a radially inwardly extending flange portion on the other end, with this flange portion being axially spaced from the second annular end surface, with these first and second annular end surfaces serving to limit the movement of the follower member in both the brake-release and the brake-application directions.

A piston is slidably and sealingly retained in the cylindrical chamber and extends axially freely through the annular chamber. The piston includes a tapered portion that carries a deformable hollow member in the annular chamber and is interference fitted therewith. One end of the hollow member is in abutment with the inwardly extending flange portion and, in response to pressurized fluid, the piston moves together with the hollow member and follower in the brake application direction until the outwardly extending flange engages the annular chamber second end portion whereupon the piston is forceably urged through at least an axial portion of the hollow member and causes deformation thereof and axially repositions the piston to take up the undesired brake clearance.

Upon release of the pressurized fluid and the urging of a spring on the outwardly directed follower flange portion, the piston, together with the hollow member and follower member is moved in the brake-release direction until the follower member outwardly extending flange portion engages the first annular end surface and thereby establishes a constant brake running clearance. The deformable hollow member preferably takes the shape of a circular or elliptical cylinder.

Other features and advantages of the invention will become more readily understood by persons skilled in the art when following the detailed description in conjunction with the drawing.

DESCRIPTION OF THE PREFERRED EMBODIMENT

Figure 1:
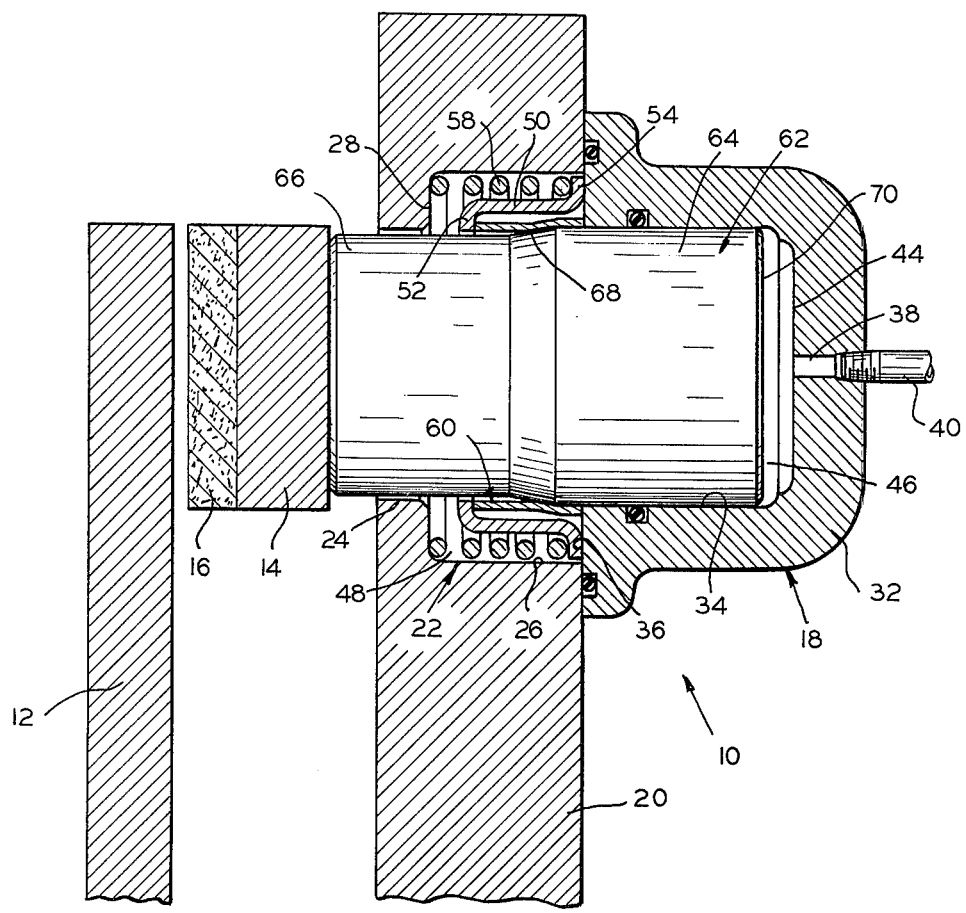
FIG. 1 is a fragmentary axial sectional view taken through a disc brake incorporating the invention.

Referring to FIG. 1, it will be seen that numeral 10 designates a brake of the disc type of construction, with the disc-type of construction merely being a representation of a common brake mechanism and it should be understood that the brake adjuster of this invention may be utilized on brakes of all types.

Brake 10 consists of one or more discs, rotors or rotating members 12 that are generally adapted to be attached to and rotated by a member that is to be braked, such as an axle shaft, hub or wheel (none of which are shown).

A pressure plate or backing member 14 has friction lining 16 affixedly secured thereto, with member 14 being suitably supported for axial movement relative to disc 12.

The force imposed on pressure plate 14 tending to axially displace it toward and into engagement with an annular side surface of disc 12, is derived from one or more fluid motors or piston and cylinder assemblies 18 secured on a rotatably fixed brake carrier member 20 that is in turn affixed to a vehicle. Brake carrier member 20 has a stepped through bore 22 which in turn has a first or small diameter bore portion 24 and a second or large diameter bore portion 26, with the inner ends of these first and second bores merging into an annular connecting surface 28.

The open end of bore 26 is closed off by the open end of a generally cup-shaped member 32 that is fixedly attached to brake carrier member 20. Cup-shaped member 32 has a bore portion 34 whose diameter is intermediate to those of bore portions 24 and 26. The open end of bore portion 34 merges into bore 26, with bores 24, 26 and 34 all being axially aligned. The open ends of bores 26 and 34 merge into an annular connecting surface 36 on cup member 32. The outer end of cup-shaped member 32 is provided with a port 38 that is connected, via a conduit 40, to receive fluid from a conventional operator-controlled pressure source, not shown.

Cup-shaped member 32 has a circular inner end surface 44 into which the inner end of port 38 merges, with generally circular end surface 44 together with bore portion 34 defining an open cylinder or chamber 46. Annular connecting surfaces 28 and 36, together with diameter portion 26 define an annular or ring-shaped chamber 48 that contains a generally cylindrical spring-type follower 50 having an inwardly extending first flange portion 52 on one end and an outwardly extending flange portion 54 on the other end.

Figures 2, 3:
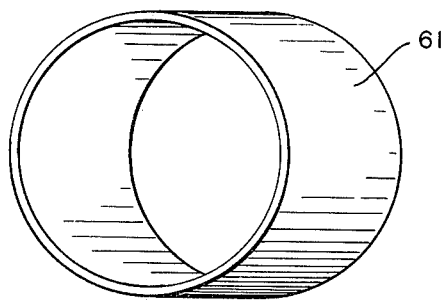
FIG. 2 is an isometric view of a deformable hollow member, in the shape of a circular cylinder, utilized in the FIG. 1 structure.
FIG. 3 is another isometric view of a deformable hollow member, in the shape of an elliptical cylinder, that can also be utilized in the FIG. 1 structure.

Also disposed within annular chamber 48 is a return spring 58, that surrounds follower 50 and has one end thereof engaged with annular surface 28 and the other end engaged with follower outward flange portion 54, thereby biasing flange portion 54 axially against annular surface 36. The major axis of annular follower 50 is less than the axial length of bore 26 so that follower 50 can be axially displaced within chamber 48 for an extent equal to the distance between flange 52 and annular surface 28, as shown in the drawing. Interposed between follower flange portion 52 and annular surface 36 is a hollow member 60 formed of metal or other suitable deformable material. By virtue of the abutment of one end of deformable hollow member 60 with follower flange 52, hollow member 60 is adapted to be moved in conjunction with follower 50 as will be explained in more detail hereinafter. Hollow member 60 preferably takes the shape of a circular cylinder 61, as shown in FIG. 2, or of an elliptical cylinder 63, shown in FIG. 3.

Fluid motor or piston and cylinder assembly 18 also includes a stepped piston 62 having a first or large diameter portion 64 slidably and sealingly received within chamber 46, with piston portion 64 partially extending into annular chamber 48. A second or small diameter portion 66 is slidingly received in bore 24 and extends axially outwardly therefrom so as to abut pressure plate or backing member 14. In addition, piston portion 62 also extends axially inwardly into annular cavity 48. Piston portions 64 and 66 are joined by an intermediate tapered piston portion 68 in annular chamber 48.

Piston portion 64 extends partially into and has an interference or press fit with deformable hollow member 60, with tapered piston portion 68 bearing against the inner surface of member 60. Thus, piston portion 64 is frictionally secured in hollow member 60 by virtue of the interference fit therebetween, with this interference fit being overcome by a predetermined force derived from pressurized fluid acting against piston 62 as will be described more fully hereinafter.

Assuming the disc-type brake 10 to be operatively mounted on a support, such as a vehicle, the fluid motor or piston assemblies 18 are energized by pressurized fluid introduced to chambers 46 via conduits 40. The pressurized fluid acts against the cylindrical end surface 70 of piston 62, thereby overcoming the force of return spring 58 and urging follower flange portions 52 into engagement with annular surface 28. Pressure plate 14, under the influence of piston 62, is urged against rotating member 12 thereby tending to compress friction lining 16 against rotor 12 and thus establishing the desired frictional engagement to retard member 12. It should be understood that the force required to compress spring 28 and obtain engagement of follower flange portion 52 with annular surface 28 is of necessity less than the force on piston cylindrical end surface 70 that is required to deform hollow member 60.

Wear of friction lining 16 results in an increase in the axial spacing between member 12 and backing member 14 which, of course, must be compensated for if lining 16 and rotating member 12 are to be fully engaged during brake energization. Assuming that such wear has occurred, it will be recognized that the engagement of follower flange portion 52 with annular surface 28 will have the affect of limiting the travel of piston 62 and thus if the wear of lining 16 exceeds the travel of follower 50, pressure plate 14 will be axially displaced for an amount insufficient to cause the engagement of friction lining 16 with rotating member 12. However, the force derived from the pressurized fluid acting against piston end face 70 is, at least equal to the force required to deform hollow member 60, by virtue of tapered piston portion 68 bearing thereagainst, and the required engagement force acting between disc 12 and lining 16. Thus, hollow member 60 is deformed thereby permitting piston 62 to advance axially through hollow member 60 and thus position pressure plate 14 toward rotating member 12 for a distance necessary to compensate for the wear of friction lining 16 and thereby establishing full engagement of lining 16 with rotating member 12. It should be understood that sufficient radial clearances are provided between hollow member 60 and follower 50 so as to permit the deformation of hollow member 60 as piston 62 is axially advanced therethrough.

The circular-to-circular deformation of circular cylinder 61 is radial (primarily tension), whereas elliptical cylinder 63, which is of course elliptical in shape prior to the passage of the conical portion 68 of piston 62, is deformed into a generally circular shape, with this deformation being of a bending nature (tension and compression).

As pressurized fluid is introduced into cavity 46, piston 62 together with hollow member 60 and follower 50 are axially displaced in unison until follower flange 52 abuts annular surface 28. Hereinafter, as piston 62 continues to be axially displaced, hollow member 60 is deformed so as to permit the passage of piston 62 therethrough.

Upon the release of pressurized fluid from cavity 46, piston 62 together with follower 50 and hollow member 60 are retracted under the influence of spring 58 until follower flange portion 54 abuts annular surface 36. Thus, the function of follower 50 is to provide for a constant running clearance between the frictionally engageable surfaces of the brake.

It should be readily apparent that the brake adjuster mechanism of this invention provides a very simple brake adjuster that has a minimum number of parts, is simple in operation and inexpensive to manufacture.

From the foregoing, it is believed that those familiar with the art will recognize and appreciate the novel concepts and features of the present invention. Obviously, while the invention has been described in relation to only a single embodiment, numerous variations, changes and substitutions of equivalents will present themselves to persons skilled in the art and may be made without necessarily departing from the scope and principles of this invention. As a result, the embodiment described herein is subject to various modifications, changes and the like, without departing from the scope and spirit of the invention, with the scope thereof being determined solely by reference to the claims appended hereto.

What is claimed is:

1. Brake adjusting apparatus for brakes of all kinds having a constant running clearance and being energized by pressurized fluid, said brake adjusting apparatus comprising:
   a. a cylindrical chamber, closed on one end, having a fluid connection, on said one end, with a controlled source of pressurized fluid;
   b. an annular chamber, having spaced first and second annular end surfaces, said annular chamber being adjacent to but radially outwardly spaced from an open end of said cylindrical chamber, said first annular end surface being adjacent to said cylinder open end;
   c. an annular follower member slidably received within said annular chamber, said first and second annular end surfaces limiting the movement of said follower member in the brake-release and brake-application directions, respectively;
   d. resilient means interposed between said second annular end surface and said annular follower member for urging said follower member into abutment with said first annular end surface;
   e. piston means slidably and sealingly retained in said cylindrical chamber and axially extending freely through said annular chamber; and
   f. a deformable hollow member slidably carried by said piston means in said annular chamber, said hollow member having an interference fit with said piston means and having one end thereof in abutment with said annular follower member;
   g. said piston means being responsive to said pressurized fluid and together with said hollow member and follower member movable in the brake-application direction, said follower member being engageable with said second annular end surface whereupon said piston means is forceably urged through at least an axial portion of said hollow member and causes deformation thereof and thereby axially repositions said piston means to the extent provided by undesired brake clearance between frictionally engageable members of the brake; with the release of the pressurized fluid and the urging of said resilient means permitting movement of said piston means together with said hollow member and follower member in the brake-release direction until said follower member engages said first annular end surface, thereby establishing a constant brake running clearance.

2. The brake adjusting apparatus of claim 1 wherein said annular follower member has a radially outwardly extending flange portion on one end adjacent to said first annular end surface.

3. The brake adjusting apparatus of claim 2 wherein said annular follower member has a radially inwardly extending flange portion on another end and axially spaced from said second annular end surface.

4. The brake adjusting apparatus of claim 2 wherein said resilient means is interposed between said second annular end surface and said outwardly-extending flange.

5. The brake adjusting apparatus of claim 3 wherein said one end of said hollow member is in abutment with said radially inwardly extending flange portion.

6. The brake adjusting apparatus of claim 1 wherein said cylindrical chamber is defined by a cup-shaped member attached to a brake carrier member; and said annular chamber is defined by said carrier member in conjunction with said cup-shaped member.

7. The brake adjusting apparatus of claim 1 wherein said hollow member is in the shape of a circular cylinder which is outwardly radially deformed by said piston.

8. The brake adjusting apparatus of claim 1 wherein said hollow member is in the shape of an elliptical cylinder that is deformed into a generally cylindrical shape by said piston.

* * * * *